United States Patent
Wang et al.

(10) Patent No.: US 9,934,176 B2
(45) Date of Patent: Apr. 3, 2018

(54) TRANSCEIVER MULTIPLEXING OVER USB TYPE-C INTERCONNECTS

(71) Applicant: Intel Corporation, Santa Clara, CA (US)

(72) Inventors: Wei Wang, San Francisco, CA (US); Hsiao-Ping J. Tsai, San Jose, CA (US); Jongbae Park, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 14/582,785

(22) Filed: Dec. 24, 2014

(65) Prior Publication Data

US 2016/0188506 A1 Jun. 30, 2016

(51) Int. Cl.
*G06F 13/28* (2006.01)
*G06F 13/40* (2006.01)
*G06F 13/42* (2006.01)

(52) U.S. Cl.
CPC ........ *G06F 13/287* (2013.01); *G06F 13/4022* (2013.01); *G06F 13/4282* (2013.01); *Y02B 60/1228* (2013.01); *Y02B 60/1235* (2013.01)

(58) Field of Classification Search
CPC .......................... G06F 13/4286; G06F 13/4059
USPC ........................................................ 710/301
See application file for complete search history.

(56) References Cited

U.S. PATENT DOCUMENTS

| | | |
|---|---|---|
| 3,155,927 A | 11/1964 | True |
| 9,472,910 B2 | 10/2016 | Little et al. |
| 9,502,168 B1 * | 11/2016 | Ler ........................ H01L 23/64 |
| 2002/0078280 A1 * | 6/2002 | Arimilli .............. G06F 13/4269 710/106 |
| 2004/0145380 A1 * | 7/2004 | Babcock .......... G01R 31/31926 324/679 |
| 2006/0020740 A1 * | 1/2006 | Bartley ............... G06F 11/2007 711/100 |

(Continued)

OTHER PUBLICATIONS

Universal Serial Bus 3.1 Spwcification Revision 1.0 Jul. 26, 2016.*

(Continued)

*Primary Examiner* — Paul R Myers
(74) *Attorney, Agent, or Firm* — International IP Law Group, P.L.L.C.

(57) ABSTRACT

An apparatus for transceiver multiplexing over USB Type-C interconnects is described herein. The apparatus includes a processor, a memory, a USB Type-C connector, a first transmitter, a multiplexed transmitter, a multiplexed receiver, and an on-die inductor. The multiplexed transmitter, when disabled, enables the multiplexed receiver to be in communication over a channel with a second transmitter over the USB Type C connector. The multiplexed receiver, when disabled, enables the multiplexed transmitter to be in communication over the channel with a receiver over the USB Type-C connector. The on-die inductor is disposed in serial with the multiplexed transmitter, and disposed in parallel with the multiplexed receiver. The on-die inductor reduces: effective shunt capacitance and insertion loss between the multiplexed transmitter and the channel; effective shunt capacitance and insertion loss between the channel and the multiplexed receiver.

23 Claims, 12 Drawing Sheets

(56) References Cited

U.S. PATENT DOCUMENTS

| | | | |
|---|---|---|---|
| 2008/0189455 A1* | 8/2008 | Dreps | G06F 13/1694 710/106 |
| 2009/0039916 A1* | 2/2009 | Buchmann | G11C 5/066 326/38 |
| 2016/0092393 A1* | 3/2016 | Nge | G06F 13/382 710/14 |
| 2016/0190840 A1* | 6/2016 | Rich | G06F 1/1632 320/106 |

OTHER PUBLICATIONS

Universal Serial Bus Type-C Cable and Connector Specification Revision 1.0 Aug. 11, 2014.*

Universal Serial Bus Type-C Cable and Connector Specification Revision 0.7 Jan. 2014.*

Galal et al., "Broadband ESD Protection Circuits in CMOS Technology", ISSCC 2003 / Session 10 / High Speed Building Blocks / Paper 10.5, Feb. 11, 2003, 10 pages.

Kim et al., "Design of a Reliable Broadband I/O Employing T-coil", Journal of Semiconductor Technology and Science, Dec. 2009, p. 198-204, vol. 9, No. 4, 7 pages.

* cited by examiner

300

400

500

600

700

900A

1000B

US 9,934,176 B2

TRANSCEIVER MULTIPLEXING OVER USB TYPE-C INTERCONNECTS

TECHNICAL FIELD

This disclosure relates generally to multiplexing. Specifically, this disclosure relates to transmitter-receiver multiplexing over a USB Type-C interconnects.

BACKGROUND

Universal Serial Bus (USB) is a common serial bus standard used to interface various devices. USB was originally designed for computers as a plug-and-play interface between a computer and peripheral devices. The USB standard simplified I/O standards for connecting a wide range of devices. Beyond the typical keyboards, mice, and flash drives, USB devices include printers, hard disk drives, video game consoles, media players and home theatre equipment, smart phones, and so on.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
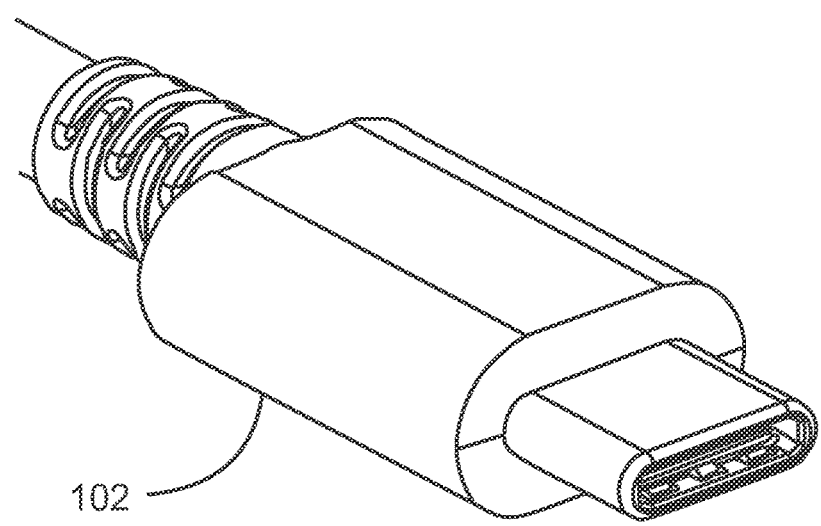
FIG. 1 is a block diagram of a universal serial bus (USB) connector plug and receptacle for transceiver multiplexing over USB Type-C interconnects.
Figure 1:
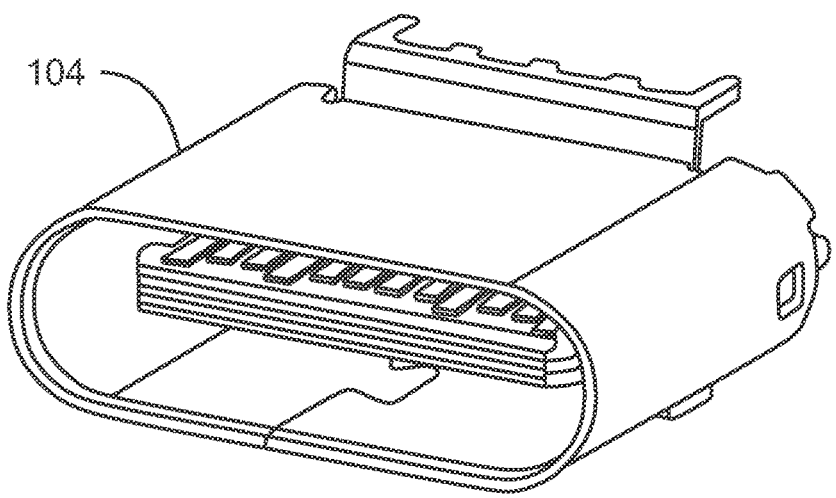

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), tablets and handheld PCs. Embedded applications typically include a microcontroller, a digital signal processor (DSP), a system on a chip, network computers (NetPC), set-top boxes, network hubs, wide area network (WAN) switches, repeaters or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems advance, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. Below, a universal serial bus (USB) interconnect is discussed, which would potentially benefit from aspects of the invention described herein.

The USB technology continues to adapt to newer computing platforms and devices as they trend toward smaller, thinner, and lighter form-factors. However, many of the newer devices are reaching a point where existing USB receptacles and plugs may inhibit innovation, given the relatively large size and internal volume constraints of USB connectors. Additionally, as platform usage models have evolved, usability and robustness requirements have advanced, and existing USB connectors are not designed for some of the newer requirements. Accordingly, a new USB interconnector system addresses the evolving needs of platforms and devices while retaining the functional benefits of USB that form the basis for the USB computing device interconnect. The USB Type-C interconnect provides new receptacle, plug, cable and detection mechanisms that are compatible with existing USB electrical and functional specifications. The USB Type-C receptacles, plug and cables enable new host and device form-factors of reduced size, and of industrial designs and styles.

FIG. 1 is a block diagram 100 of a USB Type-C plug 102 and receptacle 104 for USB transceiver multiplexing over USB Type-C interconnects. The USB Type-C plug 102 and receptacle 104 work with existing USB host and device silicon solutions. Additionally, the Type-C interconnect enhances ease of use for connecting USB devices, and reduces user confusion for plug 102 and cable orientation. In this way, the USB Type-C plug 102, receptacle 104, and cable provide a smaller, thinner and more robust alternative to existing USB 3.1 interconnects that use standard and micro USB cables and connectors. Further, the Type-C connection may be used with thin platforms, ranging from ultra-thin notebook PCs down to smart phones, where existing receptacles are: too large, difficult to use, or inadequately robust. Specifically, the USB Type-C receptacle 104 may be used in thin platforms as the total system height for the mounted receptacle is less than 3 millimeters. Additionally, the USB Type-C plug 102 enhances ease of use by being plug-able in either up or down directions. The USB Type-C cable also enhances ease of use by being plug-able in either direction between host and devices.

The Display Port Alternate Model on USB Type C Standard recently proposed by Video Electronics Standards Association (VESA) defined the use of DisplayPort as an Alternate Mode for the USB Type-C connector. The purpose of this specification is to enable an ecosystem in which the USB Type-C connector can be used to support DisplayPort and other video protocols (e.g. HDMI and VGA) in a way that is fully interoperable with existing DisplayPort and other video protocol products, with an emphasis on simplicity and ease of use with the minimum of cable types to minimize user confusion. Due to common pin assignment between USB and DisplayPort, multiplexers either on board or on die are needed in order to switch the operation between two different protocols.

Using on-board multiplexers is uncommonly preferred due to extra Bill of Materials (BOM) cost and significant high speed signal quality degradation. In the case of the computing system which does not include an on-board multiplexer, the transmitter and receiver are shorted on die in order to share the same connector pin. The consequence of this is that the die pad capacitor combined from the transmitter and the receiver is nearly doubled. Thus, to compensate for the high die pad capacitance, an on-die inductor or T-coil may be useful. However, in such a configuration, when the transmitter and receiver are multiplexed together, either the transmitter or the receiver signal path suffers significant signal degradation.

Conventional transceivers have shunt parasitic capacitance from transistors, metal routings on die, electrostatic discharge (ESD) and resistive termination. The shunt parasitic capacitance increases high frequency signal attenuation and degrades the signal quality at high data rate communication. Typically, a conventional T-coil is used to connect a transmitter (or a receiver) on one arm of the T-coil and connect the channel on another arm of the T-coil. In such a configuration, the effective shunt capacitance and the insertion loss are reduced between the transmitter (or the receiver) and channel. Insertion loss is the ratio of received to incident power and represents the power attenuation as the signal arrives at the receiving end. Return loss is the ratio of reflected to incident power and represents the loss of signal power due to discontinuity in a link channel. The discontinuity can be a mismatch between the channel components and the terminating loads. When the transmitter and the receiver are multiplexed together and the receiver is connected at the middle tap of the T-coil, the effective shunt capacitance and the insertion loss are reduced between the transmitter and the channel but are not reduced between the channel and the receiver. Further, the T-coil increases the high frequency loss from the channel to the receiver. As such, the signal quality from the transmitter to the channel is improved by the T-coil, but the signal quality arriving at the receiver from the channel becomes poor.

In examples of the present techniques, insertion and return loss for both the transmitter and receiver are improved using a single inductor. Alternatively, these losses may be improved by using a convention T-coil with an additional inductor. Additionally, the present techniques include methods for improving signal quality in both the transmission and receiving signal paths.

Figure 2:
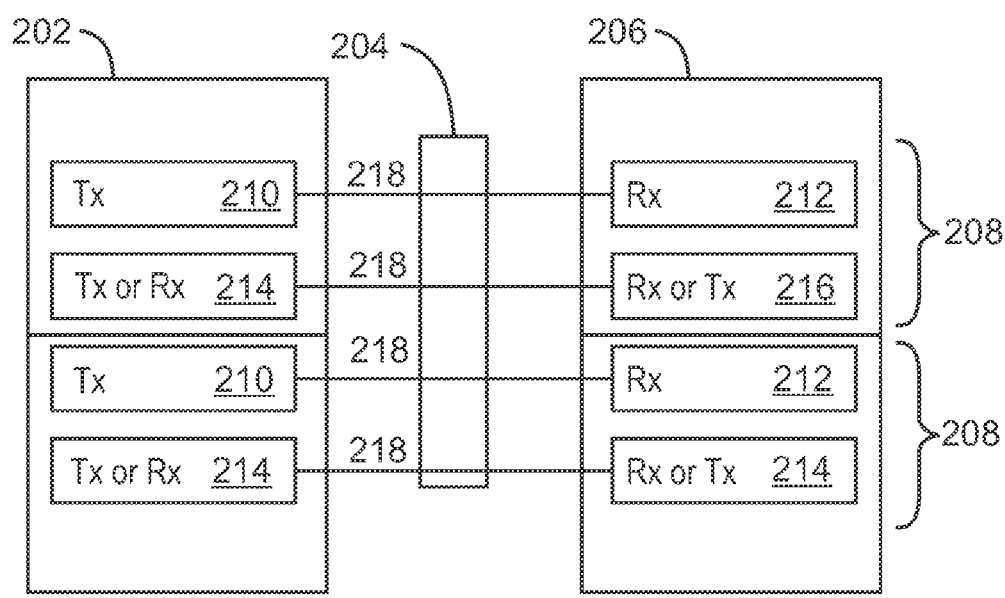
FIG. 2 is a block diagram of a system for transceiver multiplexing over a USB Type-C connector.

FIG. 2 is a block diagram of a system 200 for transceiver multiplexing over a USB Type-C interconnect. The system 200 includes a computing host 202 connected over a Type C connector 204 to a USB device 206. In one example, the host 202 is a tablet computer, and the device 206 is a high-definition television display. The USB Type C connector 204 is capable of supporting up to two full-duplex USB 3.1 channels 208 and up to 4-lane uni-directional DisplayPort protocol. DisplayPort protocol is the communication protocol used for graphics to be displayed on DisplayPort display devices. It is noted that DisplayPort devices are merely an example display device, and that other displays (and protocols such as HDMI) may be used.

Each channel 208 includes a transmit (Tx) block 210, receive (Rx) block 212, flip-able transmit or receive block 214, flip-able receive or transmit block 216, and two interconnects 218. In examples of the present techniques, each of the channels 208 is flip-able to carry a bi-directional channel or 2 uni-directional channels. A bi-directional channel transmits communications in one direction across one interconnect 218, and receives communications in the other direction across another interconnect 218. Bi-directional protocols include, for example, Peripheral Component Interconnect Express (PCIE), Mobile Industry Processor Interface (MIPI) Display Serial Interface (DSI), Thunderbolt and the like. A uni-directional connection only transmits in one direction across the interconnect. Uni-directional protocols include DisplayPort (DP), MIPI Camera Serial Interface (CSI) and the like. Examples of the present techniques may also be applied to two transmitters multiplexing or 2 receivers multiplexing. In fact, examples of the present techniques can be applied to any circuitry which uses Tx-Tx, Tx-Rx or Rx-Rx multiplexing. The rest of the components are optional.

Figure 3:
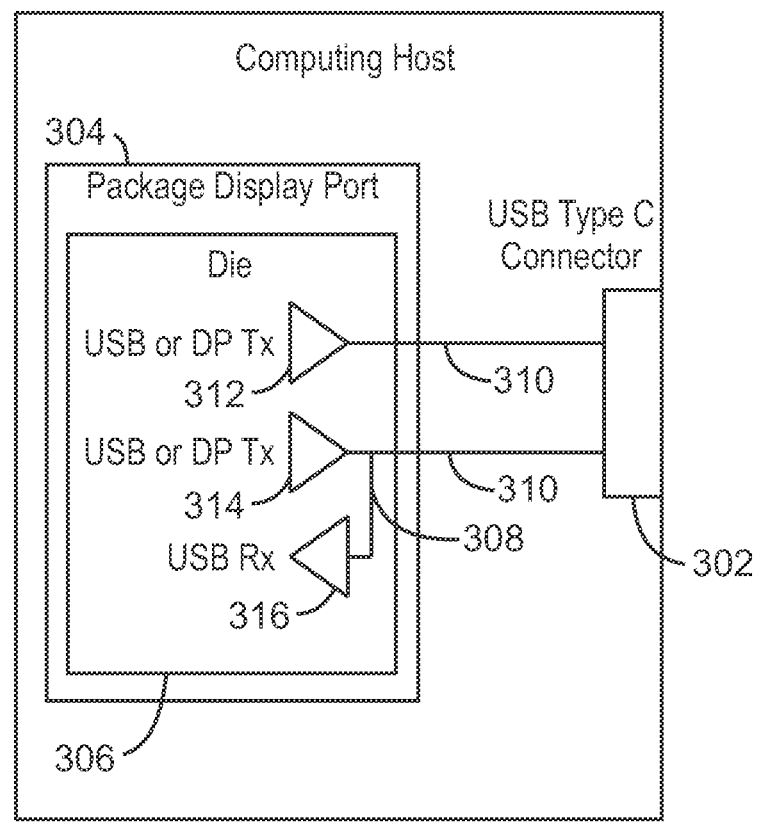
FIG. 3 is a block diagram of a system for transceiver multiplexing over a USB Type-C connector.

FIG. 3 is a block diagram of a system 300 for transceiver multiplexing over a simplified USB Type-C connector 302. The system 300 may be a computing host, such as a smartphone. For simplicity of description, the system 300 only shows two lanes, instead of the four lanes supported by the USB Type-C connector. The system 300 includes a system on chip (SoC) or a peripheral control hub (PCH) 306 within a package 304. The package 304 operates the die 306 to conduct communications over the USB Type-C connector. The die 306 in SoC or PCH is capable of flipping between bi-directional and uni-directional communication. Flipping occurs at a multiplexing point 308 with an on-die inductor (not shown). Communications between the host and the device pass over lanes 310. The die 306 includes transmission blocks 312, 314, and receive block 316.

Figure 4:
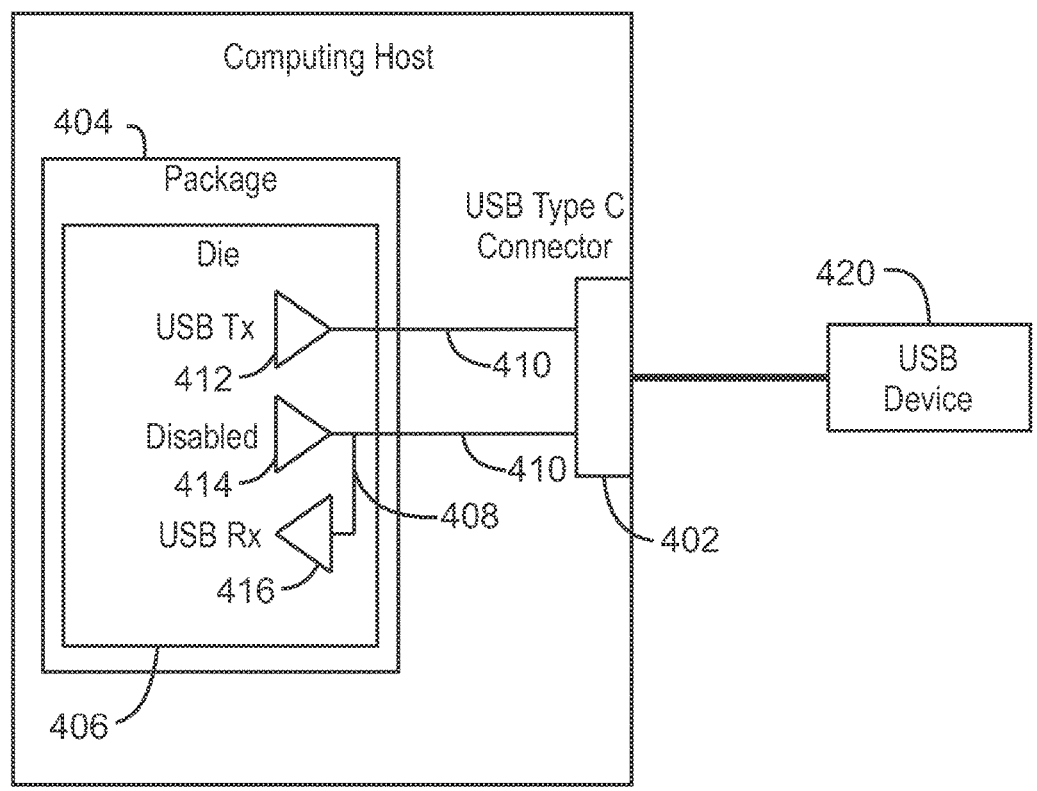
FIG. 4 is a block diagram of a bi-directional interconnect between a computing host and a USB device over USB Type-C connectors.

FIG. 4 is a block diagram of a system 400 enabled for a bi-directional USB channel over a USB Type-C connector 402. The system 400 serves as a USB host and is in communication with a USB device 420. The system 400 can also serve as a USB device and communicate with a USB host 420. As shown, the transmit block 414 is disabled. Thus, bi-directional communication is enabled to the USB device 420 from transmit block 412, and from the USB device to receive block 416.

Figure 5:
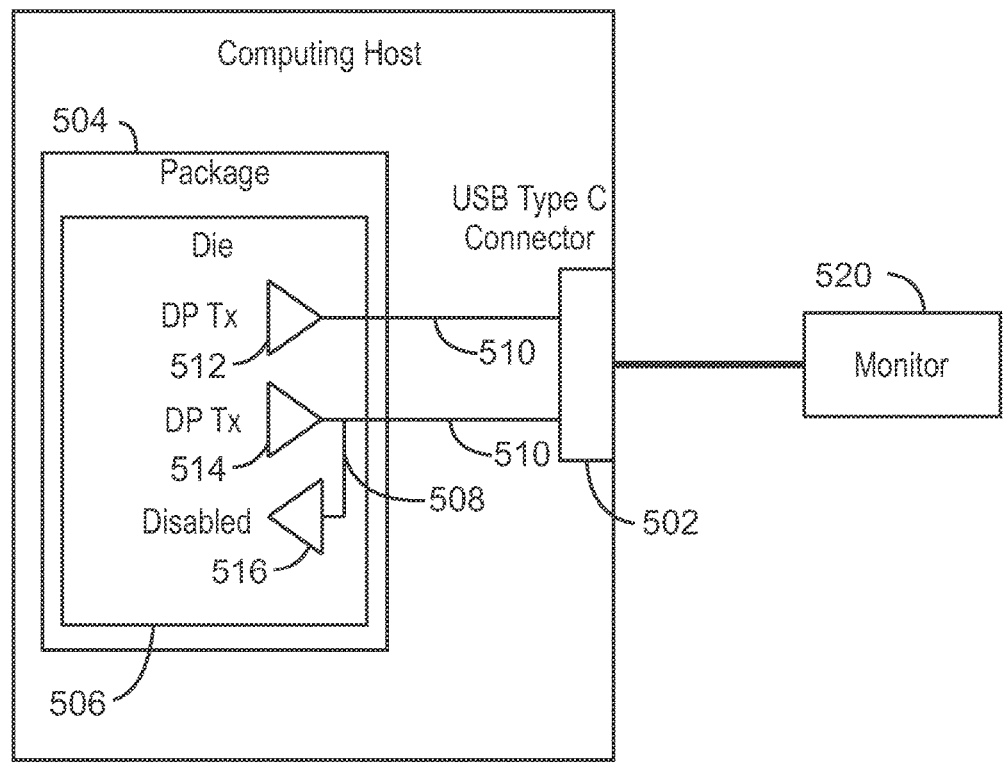
FIG. 5 is a block diagram of a uni-directional interconnect between a computing host and a monitor over USB Type-C connectors.

FIG. 5 is a block diagram of a system 500 enabled for two uni-directional DP transmission lanes over a USB Type-C connector 502. The system 500 serves as a DP host and transmit graphic and audio data to a monitor 520. As shown, receive block 516 is disabled. Thus, uni-directional communication is enabled from transmit blocks 512 and 514.

Figure 6:
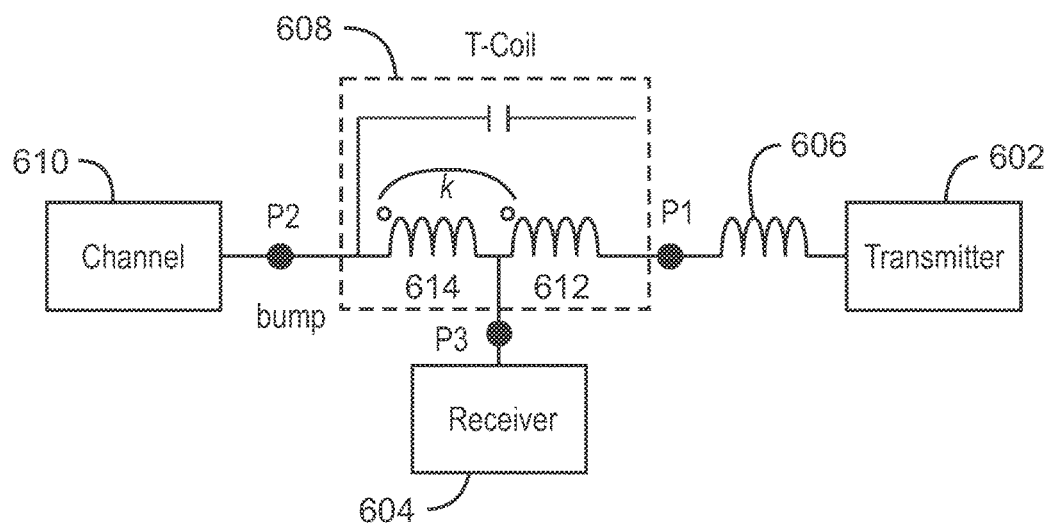
FIG. 6 is a block diagram of a system for transceiver multiplexing.

FIG. 6 is a block diagram of a system 600 for a transmitter multiplexing with a receiver. The system 600 includes a transmitter 602, a receiver 604, an inductor 606, a T-coil 608, a channel 610, arms, P1, P2, and tap P3. The T-coil includes two inductors 612, 614. The inductors 606, 612, and 614 are passive electrical components, such as coils, that resist changes in the electric current that passes through the inductor 606, 610, and 612. When current flows through the inductor 606, 610, 612, energy is stored temporarily in the coil as a magnetic field. The node P2 represents a physical boundary between the die and package.

Typically, when a transmitter 602 and a receiver 604 are shorted on die, the combined pad capacitance from the transmitter 602 and the receiver 604 deteriorates the overall channel loss. A conventional on-die T-coil inductor compensates for the capacitance at the middle arm, reducing the effective shunt capacitance. Without the additional inductor 606, the T-coil is limited to improving the insertion loss between the channel and the transmitter. However, in examples of the present techniques, the inductor 606 is inserted in between the T-coil and the transmitter 602. The inductor 606 helps reduce the effective shunt capacitance and insertion loss from arm P2 to arm P3 so that the signal quality arriving at the receiver 604 can be improved. Tuning the inductance values of the T-coil 608 and inductor 606 provides good signal quality for both the transmitter and receiver paths. Additionally, the eye margin may be recovered, or enhanced, as shown in the insertion/return loss graph of FIGS. 4 and 5. Before adding any inductor, there is no eye margin in the Tx compliance test and Rx full link test. After multiplexing with T-coil and additional inductor, the eye margin has improved and passed the Tx compliance and Rx full link test.

Figure 7:
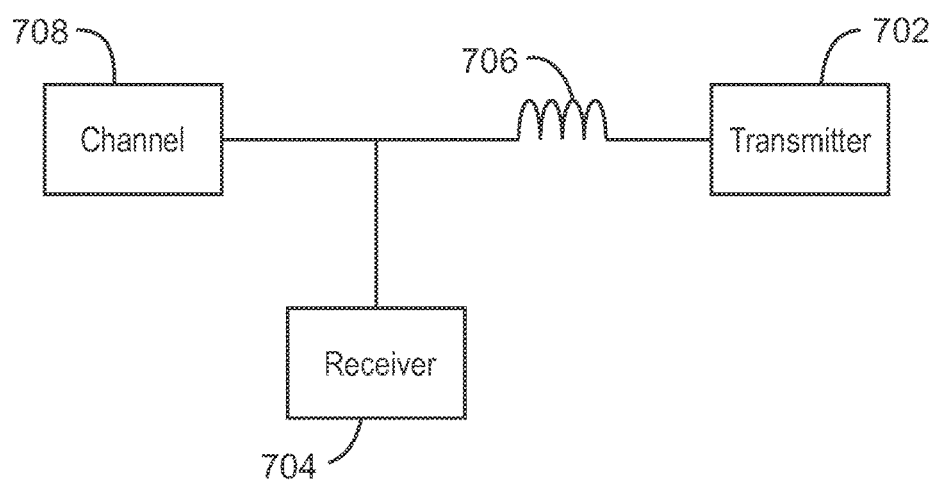
FIG. 7 is a block diagram of a system for transceiver multiplexing.

FIG. 7 is a block diagram of a system 700 for transmitter-receiver multiplexing. In an alternative example of the present techniques, the system 700 includes a transmitter 702, receiver 704, inductor 706, and channel 708. This example eliminates the placement of T-coil in order to improve the die area efficiency and power integrity since T-coil generally occupies large area on the top of metal layers that may be used for power delivery. In the system 700, a single inductor 706, is inserted to be in series with the transmitter 702, and to be in parallel with the receiver 704. In this way, the insertion loss of the transmitter and receiver paths is reduced. Further, both the eye margins of the transmitter compliance test and the receiver full link test are improved, as shown in FIGS. 4 and 5, and Table 1. The system 700 may be any computing device where a short circuit is used to multiplex. The multiplexing may take place between the transmitter 702 and the receiver 704, two transceivers 702, 704 in any transceiver design. Further, the system 700 may include systems with high speed I/O interfaces that are flexibly switched between each other on die. If only an on-die inductor is used to short the transmitter and the receiver as shown in FIG. 7, the receiver path can obtain significant signal quality enhancement with little or no signal degradation in the transmitter path.

Figure 8:
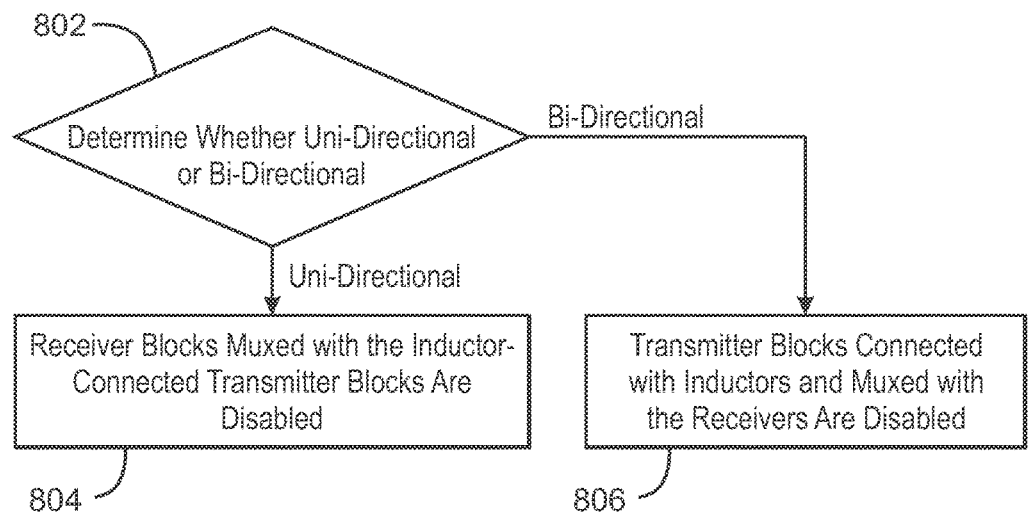
FIG. 8 is a process flow diagram of a method for transceiver multiplexing over USB Type-C connectors.

FIG. 8 is a process flow diagram of a method 800 for transceiver multiplexing over USB Type-C interconnects. In an example of the present techniques, the method 800 is performed by the package, such as package 404 of host 400, where a protocol handshake takes place between the host 400 and the device 420 after the device 420 is powered on, or plugged in to the USB Type-C connector. The method 800 ensures that unwanted transmitters or receivers will be disabled (or powered off) accordingly. The method 800 begins at block 802 where the package 404 determines whether communication with the USB device 420 is uni-directional or bi-directional. If the communication is uni-directional, at block 804, the receiver blocks 416 that are multiplexed with the transmitters 414 with on-die inductors are disabled. In this way, the host device 400 may transmit 4 lanes of communications, such as DisplayPort communications, over the USB Type-C interconnect. If the communication is bi-directional, the method flows to block 806, where the transmitter blocks 414 that are multiplexed with the receivers 416 are disabled.

Figure 9A:
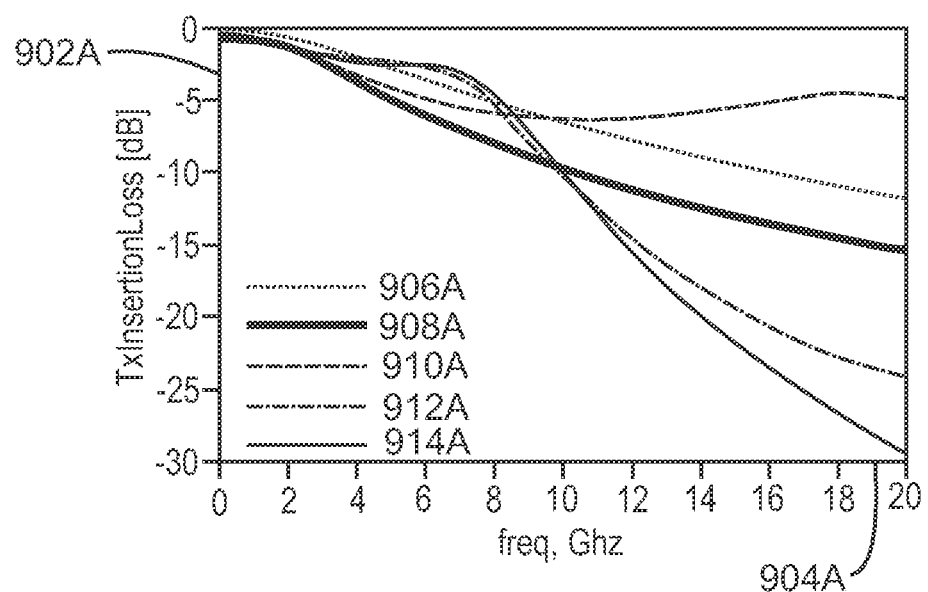
FIG. 9A is a graph showing transmitter insertion loss in transceiver multiplexing.

FIG. 9A is a graph 900A showing on-die transmission insertion loss in transceiver multiplexing. The graph 900A includes a y-axis 902A for transmission insertion loss in decibels (dB), against an x-axis 904A for frequencies in gigahertz (Ghz). The graph 900A provides a comparison of transmission insertion losses 906A, 908A, 910A, 912A, and 914A between 0 and 20 Ghz frequencies for respective systems: with no multiplexing; multiplexing without inductors (and T-coils); multiplexing with T-coil; multiplexing with T-coil and additional inductor, i.e., system 600; and multiplexing with an inductor in-series with the transmitter, and in parallel with the receiver, i.e., system 700.

As stated previously, a conventional on-die T-coil inductor compensates for the capacitance at the middle arm, reducing the effective shunt capacitance. Without the additional inductor 606 of system 600, the T-coil is limited to improving the insertion loss between the channel and the transmitter. Using insertion loss 906A for no multiplexing as the base line for comparison, Insertion loss 908A for multiplexing without inductor shows monotonically increased loss from 0 to 20 GHz. Insertion loss 910A for the system with only T-coil induction becomes worse than the non-multiplexed system below 10 GHz. In contrast, insertion loss 912A and 914A for system 600 shows improvement over the rest of the systems at frequencies below 8 GHz.

Figure 9B:
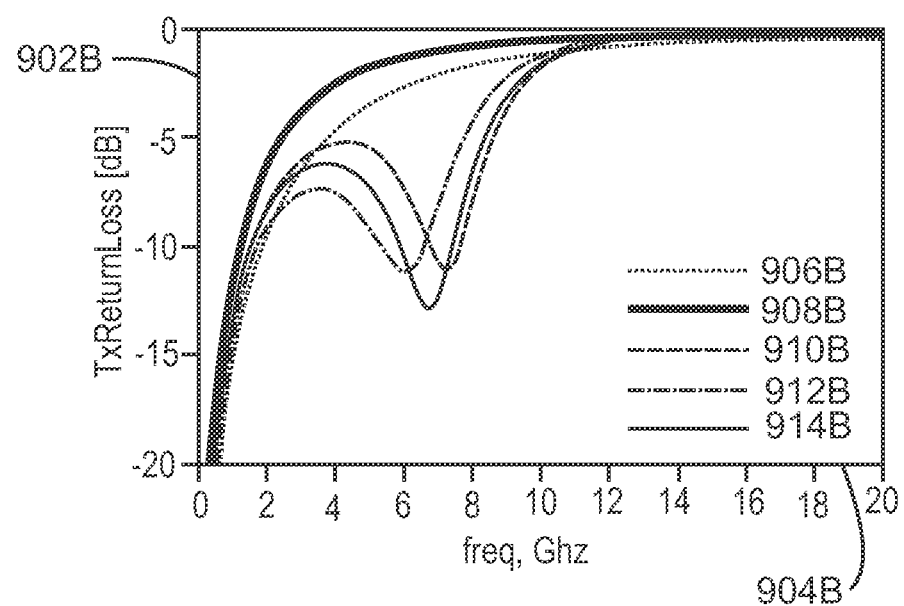
FIG. 9B is a graph showing transmitter return loss in transceiver multiplexing.

FIG. 9B is a graph 900B showing transmission return loss in transceiver multiplexing. The graph 900B includes a y-axis 902B for transmission return loss in decibels (dB), against an x-axis 904B for frequencies in gigahertz (Ghz). The graph 900B provides a comparison of transmission return losses 906B, 908B, 910B, 912B, and 914B between 0 and 20 Ghz frequencies for respective systems: with no multiplexing; multiplexing without inductors (and T-coils); multiplexing with T-coil; multiplexing with T-coil and additional inductor, i.e., system 600; and multiplexing with an inductor in-series with the transmitter, and in parallel with the receiver, i.e., system 700.

As shown, return losses 906B and 908B are high. Return loss 910B, 912B and 914B shows improvement over the non-multiplexed system and the multiplex system without inductor below 10 GHz.

Figure 10A:
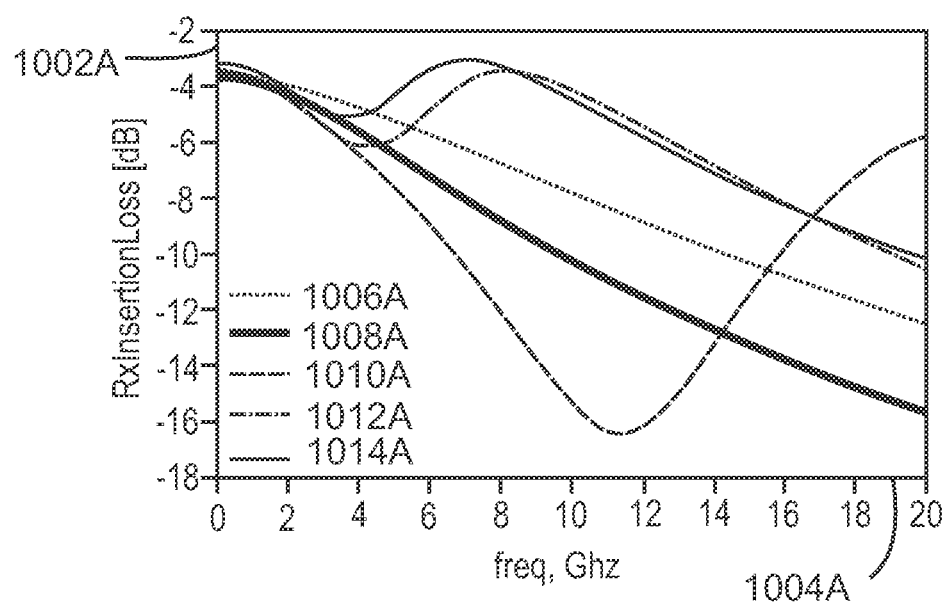
FIG. 10A is a graph showing receiver insertion loss in transceiver multiplexing.

FIG. 10A is a graph 1000A showing on-die receiver insertion loss in transceiver multiplexing. The graph 1000A includes a y-axis 1002A for receiver insertion loss in decibels (dB), against an x-axis 1004A for frequencies in gigahertz (Ghz). The graph 1000A provides a comparison of receiver insertion losses 1006A, 1008A, 1010A, 1012A, and 1014A between 0 and 20 Ghz frequencies for respective systems: with no multiplexing; multiplexing without inductors (and T-coils); multiplexing with T-coil; multiplexing with T-coil and additional inductor, i.e., system 600; and multiplexing with an inductor in-series with the transmitter, and in parallel with the receiver, i.e., system 700.

Using insertion loss 1006A for no multiplexing as the base line for comparison, Insertion loss 1008A for multiplexing without inductor shows monotonically increased loss from 0 to 20 GHz. Insertion loss 1010A for the system with only T-coil induction becomes much worse than 1006A and 1008A below 14 GHz. In contrast, insertion loss 1012A and 1014A show improvement over all systems at frequencies above 6 GHz.

Figure 10B:
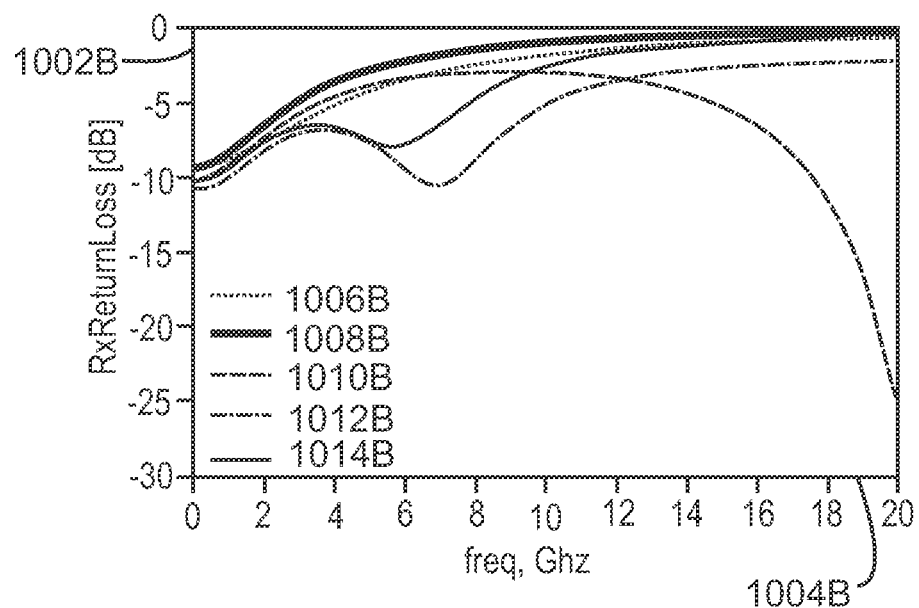
FIG. 10B is a graph showing receiver return loss in transceiver multiplexing.

FIG. 10B is a graph 1000B showing receiver return loss in transceiver multiplexing. The graph 1000B includes a y-axis 1002B for receiver return loss in decibels (dB), against an x-axis 1004B for frequencies in gigahertz (Ghz). The graph 1000B provides a comparison of receiver return losses 1006B, 1008B, 1010B, 1012B, and 1014B between 0 and 20 Ghz frequencies for respective systems: with no multiplexing; multiplexing without inductors (and T-coils); multiplexing with T-coil; multiplexing with T-coil and additional inductor, i.e., system 600; and multiplexing with an inductor in-series with the transmitter, and in parallel with the receiver, i.e., system 700.

As shown, return loss 1006B steadily increases, remaining high through all frequencies, and return loss 1008B is worse than the non-multiplexed system. Return loss 1010B for the system with only T-coil induction shows no improvement over 1006B below 8 GHz. In contrast, return loss 1012B for system 100 shows improvement over 1006 at frequencies less than 12 GHz. The return loss 1014B for the system 200 shows improved return loss over 1006B at frequencies less than about 20 GHz. Generally, FIGS. 9A, 9B, 10A, and 10B show that both transmitter and receiver insertion/return loss is improved at 5 GHz range compared to the baseline as well as the conventional T-coil design.

Table 1 shows the eye margin of Tx compliance test and Rx full link test for a 10 gigabit per second (Gbps) USB 3.1 Channel:

TABLE 1

| Configuration | Rx full link test | | Tx compliance test | |
|---|---|---|---|---|
| | Eye height (mV) | Eye width (ps) | Eye height (mV) | Eye width (ps) |
| Pass criteria | 0 | 0 | 70 | 32.9 |
| Baseline without Tx/Rx multiplexing | 11 | 6.2 | 81.2 | 45.7 |
| Multiplexing without T-coil and inductor | −1 | 1.2 | 64.6 | 38.1 |
| Multiplexing with T-coil only | −7.8 | −1.8 | 74.9 | 43.6 |
| Multiplexing with T-coil and inductor (system 100) | 7.2 | 4.4 | 77.8 | 46.1 |
| Multiplexing with Inductor, no T-coil (system 200) | 22.4 | 10 | 77.8 | 46.2 |

In Table 1, the system eye magnitude without Tx and Rx multiplexing is used as the base line in the Rx full link test and the Tx compliance tests. The passing criteria are 0 mV and 0 ps in the Rx full link test and 70 mV and 32.9 ps in the Tx compliance test for 10 Gbps Super Speed USB Gen2 as an example. After multiplexing Tx and Rx without any inductor integration, the system fails the both Tx and Rx margin tests. When the T-coil is integrated, only the Tx margin is improved and the Rx margin is degraded. When T-coil and an inductor were both integrated in system 600, both Tx and Rx margin are improved. Additionally, Table 1 shows that the receiver margin of system 700 is even better than the case without transmitter/receiver multiplexing.

EXAMPLES

An example apparatus includes a processor, a memory, a USB Type-C connector, a first transmitter, a multiplexed transmitter, a multiplexed receiver, and an on-die inductor. The multiplexed transmitter, when disabled, enables the multiplexed receiver to be in bi-directional communication over a channel with a second transmitter over the USB Type C connector. The multiplexed receiver, when disabled, enables the multiplexed transmitter to be in uni-directional communication over the channel with a receiver over the USB Type-C connector. The on-die inductor is disposed in serial with the multiplexed transmitter, and disposed in parallel with the multiplexed receiver. The on-die inductor reduces: effective shunt capacitance and insertion loss between the multiplexed transmitter and the channel; and effective shunt capacitance and insertion loss between the channel and the multiplexed receiver.

In an example apparatus, the first transmitter may be configured as a USB3.1 transmitter, a Thunderbolt transmitter, a PCIe transmitter, a DisplayPort transmitter or a Mobile Industry Processor Interface transmitter.

In an example apparatus, the multiplexed transmitter may include a DisplayPort transmitter or a Mobile Industry Processor Interface transmitter.

In an example apparatus, the multiplexed receiver may include a USB3.1 receiver, a Thunderbolt receiver, a PCIe receiver, or a Mobile Industry Processor Interface receiver.

An example apparatus also includes a T-coil. The T-coil includes a first arm, a second arm, and a middle tap. The on-die inductor is disposed between the first arm and the multiplexed transmitter. The second arm is connected with the channel. The middle tap is connected with the multiplexed receiver. The multiplexed transmitter is a voltage-mode driver.

Another example apparatus includes a T-coil. However, the on-die inductor is disposed between the first arm and the multiplexed receiver. The middle tap is connected with the multiplexed transmitter. The multiplexed transmitter is a current-mode driver.

An example apparatus includes a processor, a memory, a USB Type-C connector, a first transmitter, a multiplexed transmitter, a multiplexed receiver, a T-coil, and an on-die inductor. The multiplexed transmitter, when disabled, enables a multiplexed receiver to be in bi-directional communication over a channel with a second transmitter over the USB Type C connector. The multiplexed receiver, when disabled, enables the multiplexed transmitter to be in uni-directional communication over the channel with a receiver over the USB Type-C connector. The T-coil reduces effective shunt capacitance and insertion loss between the multiplexed transmitter and the channel. The on-die inductor reduces effective shunt capacitance and insertion loss between the channel and the multiplexed receiver.

An example method determines whether communication over a Type-C interconnect is uni-directional or bi-directional. If the communication is uni-directional, a multiplexed receiver being multiplexed with a multiplexed transmitter is disabled. If the communication is bi-directional, the multiplexed transmitter is disabled. The communication over the Type-C interconnect may take place between a transmitting device and a receiving device or between two transceiver devices.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for transceiver multiplexing over a serial bus, the apparatus comprising:
    a reversible, multi-mode, bi-directional power connector;
    a first transmitter;
    a multiplexed transmitter which, when disabled, is to enable a multiplexed receiver, to be in communication over a channel with a second transmitter over a USB Type C connector;
    the multiplexed receiver which, when disabled, is to enable the multiplexed transmitter to be in communication over the channel with a receiver over the USB Type-C connector; and
    an on-die inductor disposed:
        in serial with the multiplexed transmitter; and
        in parallel with the multiplexed receiver; and
    a T-coil comprising:
        a first inductor being disposed between the on-die inductor and a second inductor, wherein the first inductor is disposed between the multiplexed transmitter and the multiplexed receiver; and
        the second inductor, being disposed between the first inductor and the channel.

2. The apparatus of claim 1, the on-die inductor to reduce:
    effective shunt capacitance and insertion loss between the multiplexed transmitter and the channel; and
    effective shunt capacitance and insertion loss between the channel and the multiplexed receiver.

3. The apparatus of claim 1, the reversible, multi-mode, bi-directional power connector being based on a universal serial bus (USB) Type-C specification.

4. The apparatus of claim 1, the first transmitter and the multiplexed transmitter comprising 2 DisplayPort lanes.

5. The apparatus of claim 1, the first transmitter and the multiplexed transmitter comprising 2 Mobile Industry Processor Interface lanes.

6. The apparatus of claim 1, the first transmitter and the multiplexed receiver comprising a USB3.1 port.

7. The apparatus of claim 1, the first transmitter and the multiplexed receiver comprising a Thunderbolt port.

8. The apparatus of claim 1, the first transmitter and the multiplexed receiver comprising a PCIe port.

9. The apparatus of claim 1, the first transmitter and the multiplexed receiver comprising a Mobile Industry Processor Interface port.

10. The apparatus of claim 1, comprising a T-coil, the T-coil comprising:
    a first arm, the on-die inductor being disposed between the first arm and the multiplexed transmitter;
    a second arm connected with the channel; and
    a middle tap connected with the multiplexed receiver, the multiplexed transmitter being a voltage-mode driver.

11. The apparatus of claim 1, comprising a T-coil, the T-coil comprising:
    a first arm, the on-die inductor being disposed between the first arm and the multiplexed receiver;
    a second arm connected with the channel; and
    a middle tap connected with the multiplexed transmitter, the multiplexed transmitter being a current-mode driver.

12. An apparatus for transceiver multiplexing over a serial bus, the apparatus comprising:
    a reversible, multi-mode, bi-directional power connector;
    a first transmitter;
    a multiplexed transmitter which, when disabled, is to enable a multiplexed receiver, to be in communication over a channel with a second transmitter over the reversible, multi-mode, bi-directional power connector;
    the multiplexed receiver which, when disabled, is to enable the multiplexed transmitter to be in communication over the channel with a receiver over the reversible, multi-mode, bi-directional power connector;
    a T-coil comprising:
        a first arm;
        a second arm connected with the channel;

a middle tap;
a first inductor being disposed between an on-die inductor and a second inductor, wherein the first inductor is disposed between the multiplexed transmitter and the multiplexed receiver; and
the second inductor, being disposed between the first inductor and the channel; and
the on-die inductor to reduce:
effective shunt capacitance and insertion loss between the multiplexed transmitter and the channel; and
effective shunt capacitance and insertion loss between the channel and the multiplexed receiver.

13. The apparatus of claim 12, the on-die inductor being disposed between the first arm and the multiplexed transmitter, and the multiplexed receiver being a voltage-mode driver.

14. The apparatus of claim 12, the on-die inductor being disposed between the first arm and the multiplexed receiver, and the multiplexed transmitter being a current-mode driver.

15. The apparatus of claim 12, the first transmitter and the multiplexed transmitter comprising 2 DisplayPort lanes.

16. The apparatus of claim 12, the first transmitter and the multiplexed transmitter comprising 2 Mobile Industry Processor Interface transmitter lanes.

17. The apparatus of claim 12, the first transmitter and the multiplexed receiver comprising a USB 3.1 port.

18. The apparatus of claim 12, the first transmitter and the multiplexed receiver comprising a Thunderbolt port.

19. The apparatus of claim 12, the first transmitter and the multiplexed receiver comprising a PCIe port.

20. The apparatus of claim 12, the first transmitter and the multiplexed receiver comprising a Mobile Industry Processor Interface port.

21. The apparatus of claim 12, the reversible, multi-mode, bi-directional power connector being based on a universal serial bus (USB) Type-C specification.

22. A method for transceiver multiplexing over a serial bus, the method comprising:
determining whether communication over a reversible, multi-mode, bi-directional power connector, is uni-directional or bi-directional, wherein the communication takes place over a channel that is connected with an inductor;
disabling a multiplexed receiver if the communication is uni-directional, the multiplexed receiver being multiplexed with a multiplexed transmitter, the multiplexed transmitter being connected with the inductor; and
disabling the multiplexed transmitter if the communication is bi-directional, wherein the multiplexed receiver is connected with a middle tap of a T-coil, the inductor being disposed between the multiplexed transmitter and a first arm of the T-coil, and wherein the channel is connected with a second arm of the T-coil, wherein the T-coil comprises:
a first inductor being disposed between an on-die inductor and a second inductor, wherein the first inductor is disposed between the multiplexed transmitter and the multiplexed receiver; and
the second inductor, being disposed between the first inductor and the channel.

23. The method of claim 22, the reversible, multi-mode, bi-directional power connector being based on a universal serial bus (USB) Type-C specification.

* * * * *